US009562597B2

(12) United States Patent
Depraete et al.

(10) Patent No.: US 9,562,597 B2
(45) Date of Patent: Feb. 7, 2017

(54) HYDROKINETIC TORQUE COUPLING DEVICE WITH TURBINE-PISTON LOCK-UP CLUTCH AND BEVEL GEARING

(71) Applicant: VALEO EMBRAYAGES, Amiens (FR)

(72) Inventors: Alexandre Depraete, Bloomfield, MI (US); Eugene Kozak, Royal Oak, MI (US)

(73) Assignee: Valeo Embrayages (FR)

( * ) Notice: Subject to any disclaimer, the term of this patent is extended or adjusted under 35 U.S.C. 154(b) by 168 days.

(21) Appl. No.: 14/510,244

(22) Filed: Oct. 9, 2014

(65) Prior Publication Data

US 2016/0102743 A1   Apr. 14, 2016

(51) Int. Cl.
*F16H 45/02* (2006.01)
*F16H 47/08* (2006.01)
(Continued)

(52) U.S. Cl.
CPC .............. *F16H 45/02* (2013.01); *F16H 41/24* (2013.01); *F16H 47/08* (2013.01);
(Continued)

(58) Field of Classification Search
CPC .... F16H 41/24; F16H 2041/246; F16H 45/02; F16H 2045/0205; F16H 2045/0221; F16H 2045/0278; F16H 2045/007; F16H 2045/0263; F16H 47/08
(Continued)

(56) References Cited

U.S. PATENT DOCUMENTS 2,130,895 A   9/1938 Ness
2,860,747 A   11/1958 Kelley
(Continued)

FOREIGN PATENT DOCUMENTS

DE   1550957 A1   7/1969
DE   2245901 A1   4/1974
(Continued)

OTHER PUBLICATIONS

Lindemann et al., "iTC—Innovative Solutions for Torque Converters Pave the Way into the Future", Torque Converter 20, pp. 280-301.
(Continued)

*Primary Examiner* — Richard Lorence
(74) *Attorney, Agent, or Firm* — Berenato & White, LLC (57) ABSTRACT

A hydrokinetic torque coupling device for coupling together a driving shaft and a driven shaft. The torque coupling device includes a casing rotatable about a rotational axis and having a casing cover shell and an impeller shell, an impeller coaxial aligned with the rotational axis and including the impeller shell, a turbine-piston coaxially aligned with and drivable by the impeller, a stator situated between the impeller and the turbine-piston, an output member including an output bevel gear, a torsional vibration damper operatively connecting the turbine-piston and the output hub, a rotatable input bevel gear drivenly connected to the torsional vibration damper, a carrier configured to connect to a stationary stator shaft, and a bevel pinion supported by and rotatable relative to the carrier. The bevel pinion meshes with gear teeth of the input bevel gear and gear teeth of the output bevel gear of the output member.

20 Claims, 5 Drawing Sheets

(51) Int. Cl.
  *F16H 41/24* (2006.01)
  *F16H 45/00* (2006.01)

(52) U.S. Cl.
  CPC .. *F16H 2041/246* (2013.01); *F16H 2045/007* (2013.01); *F16H 2045/0205* (2013.01); *F16H 2045/0221* (2013.01); *F16H 2045/0263* (2013.01); *F16H 2045/0278* (2013.01)

(58) Field of Classification Search
  USPC .............................. 192/3.28–3.31; 74/730.1
  See application file for complete search history.

(56) References Cited

U.S. PATENT DOCUMENTS

| | | | |
|---|---|---|---|
| 2,992,713 | A | 7/1961 | Stump et al. |
| 3,041,892 | A | 7/1962 | Schjolin |
| 3,252,352 | A | 5/1966 | General et al. |
| 4,041,701 | A | 8/1977 | Goto et al. |
| 4,177,694 | A * | 12/1979 | Lachaize ............... F16H 47/06 192/3.22 |
| 5,713,442 | A | 2/1998 | Murata et al. |
| 5,813,505 | A | 9/1998 | Olsen et al. |
| 6,026,940 | A | 2/2000 | Sudau |
| 6,915,886 | B2 | 7/2005 | Dacho et al. |
| 7,191,879 | B2 | 3/2007 | Arhab et al. |
| 7,445,099 | B2 | 11/2008 | Maucher et al. |
| 8,276,723 | B2 | 10/2012 | Verhoog et al. |
| 2003/0168298 | A1 | 9/2003 | Holler et al. |
| 2003/0168299 | A1 | 9/2003 | Holler et al. |
| 2004/0011032 | A1* | 1/2004 | Holler ................... F16D 33/06 60/347 |
| 2006/0086584 | A1 | 4/2006 | Maucher et al. |
| 2013/0230385 | A1 | 9/2013 | Lindemann et al. |
| 2014/0014454 | A1 | 1/2014 | Davis |
| 2014/0014455 | A1 | 1/2014 | Davis |
| 2014/0097055 | A1 | 4/2014 | Lindemann et al. |
| 2014/0110207 | A1 | 4/2014 | Davis |
| 2015/0362041 | A1 | 12/2015 | Lee et al. |
| 2016/0102746 | A1* | 4/2016 | Depraete ............... F16H 47/08 475/59 |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.

* cited by examiner

HYDROKINETIC TORQUE COUPLING DEVICE WITH TURBINE-PISTON LOCK-UP CLUTCH AND BEVEL GEARING

BACKGROUND OF THE INVENTION

1. Field of the Invention

The present invention generally relates to hydrokinetic torque coupling devices, and more particularly to a hydrokinetic torque coupling device including a turbine-piston lock-up clutch for mechanically coupling driving and driven shafts, and bevel gearing.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts. Lock-up clutches are described in, for example, U.S. Pat. No. 8,276,723 and U.S. Pat. No. 7,191,879.

Typically, a hydrokinetic torque coupling device includes a casing, a hydrodynamic torque converter, a torsional vibration damper and a lock-up clutch provided for locking the torque converter. The torque converter includes an impeller connected to a driving shaft through the casing, a turbine axially fixed relative to the impeller and intended to be rotationally connected to a driven shaft, and a stator.

The casing includes a front casing shell and a rear casing shell fixedly interconnected together. Typically, the front casing shell is coupled to and rotatably driven by an internal combustion engine, while the rear casing shell serves as an impeller shell of the impeller and is adjacent to a vehicular transmission. In other words, conventionally, the impeller is on a transmission side, while the turbine is on an engine side.

However, torque coupling devices are known having the impeller and turbine reversed, i.e., wherein the impeller on the engine side and the turbine is on the transmission side. Such a reverse torque coupling device is described in, for example, KR 10-1311531. In such reverse torque coupling devices, a normally hollow stationary stator shaft is replaced by a solid shaft within a hollow rotating transmission input shaft. Conversely, a normally solid transmission input shaft is replaced by a hollow shaft rotating about a solid stationary stator shaft. This reversal of shaft configuration creates shaft support issues for the transmission.

While hydrokinetic torque coupling devices with lock-up clutches have proven to be acceptable for vehicular driveline applications and conditions, improvements that may enhance their performance and cost are possible. Further, it would be beneficial to reverse the impeller and turbine while maintaining the standard transmission interface in which the stationary stator shaft is hollow and the transmission input shaft is solid and extends within the hollow stationary stator shaft. As another example of an improvement, it would be beneficial to reduce the spatial requirements of components of the hydrokinetic torque coupling device and/or to consolidate functions of two or more components into a single component.

BRIEF SUMMARY OF THE INVENTION

According to a first aspect of the invention, a hydrokinetic torque coupling device is provided for coupling a driving shaft and a driven shaft. The hydrokinetic torque coupling device comprises a casing rotatable about a rotational axis and having an interior volume. The casing comprises a casing cover shell and an impeller shell disposed axially opposite to and fixedly connected to the casing cover shell. The torque coupling device further comprises an impeller coaxial aligned with the rotational axis and comprising the impeller shell, a turbine-piston coaxially aligned with and drivable by the impeller and comprising a turbine-piston shell, a stator situated between the impeller and the turbine-piston, an output member including an output bevel gear, an input bevel gear drivingly connected to the turbine-piston, a carrier configured to connect to a stator shaft to prevent rotation of the carrier about the rotational axis of the casing, and a bevel pinion rotatably supported by the carrier. The bevel pinion meshes with the input bevel gear and the output bevel gear of the output member.

According to a second aspect of the invention, a method is provided for assembling a hydrokinetic torque coupling device for coupling a driving shaft and a driven shaft together. The method involves providing a torque converter coaxially aligned with and rotatable about a rotational axis. The torque converter comprises an impeller, a turbine-piston, and a stator disposed between the impeller and the turbine-piston. The impeller comprises an impeller shell and a plurality of impeller blades. The turbine-piston comprises a turbine-piston shell, a plurality of turbine blades, and an axially movable turbine-piston flange. The method further involves providing an output member including an output bevel gear, a rotatable input bevel gear, a carrier configured to connect to a stator shaft to prevent rotation of the carrier about the rotational axis of the torque converter, and a bevel pinion supported by the carrier and rotatable about a longitudinal axis of the bevel pinion. The torque converter is combined with a casing shell, the output member, the input bevel gear and the carrier with the bevel pinion so that the casing shell and the impeller shell collectively establish a casing of the hydrokinetic torque coupling device. The turbine-piston shell is positioned in the casing to partition an interior volume of the casing into a first chamber between the impeller shell and the turbine-piston shell, and a second chamber between the turbine-piston shell and the casing shell. The input bevel gear is drivingly connected to the turbine-piston. The bevel pinion is positioned to transmit torque from the input bevel gear to the output member when the hydrokinetic torque device is in a lockup mode.

A third aspect of the invention provides a method of operating a hydrokinetic torque coupling device. The hydrokinetic torque coupling device features a casing rotatable about a rotational axis and comprising a casing shell and an impeller shell disposed axially opposite to and fixedly connected to the casing shell, an impeller comprising the impeller shell and a piston engagement portion having a first engagement surface, a turbine-piston comprising a turbine-piston shell including a turbine-piston flange with a second engagement surface, a stator situated between the impeller and the turbine-piston, an output member including an output bevel gear, a rotatable input bevel gear, a carrier configured to connect to a stator shaft to prevent rotation of the carrier about the rotational axis of the casing, and a bevel pinion supported by the carrier and rotatable about a longitudinal axis of the bevel pinion. The bevel pinion meshes with gear teeth of the input bevel gear and gear teeth of the output bevel gear of the output member. The method comprises axially displacing the turbine-piston relative to the casing to move the second engagement surface toward and away from the first engagement surface of the piston engagement portion to position the hydrokinetic torque coupling device respectively into and out of a lockup mode in which the first and second engagement surfaces are frictionally, non-rotatably coupled to one another to mechanically lock the turbine-piston to the piston engagement portion.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one."

Figure 1:
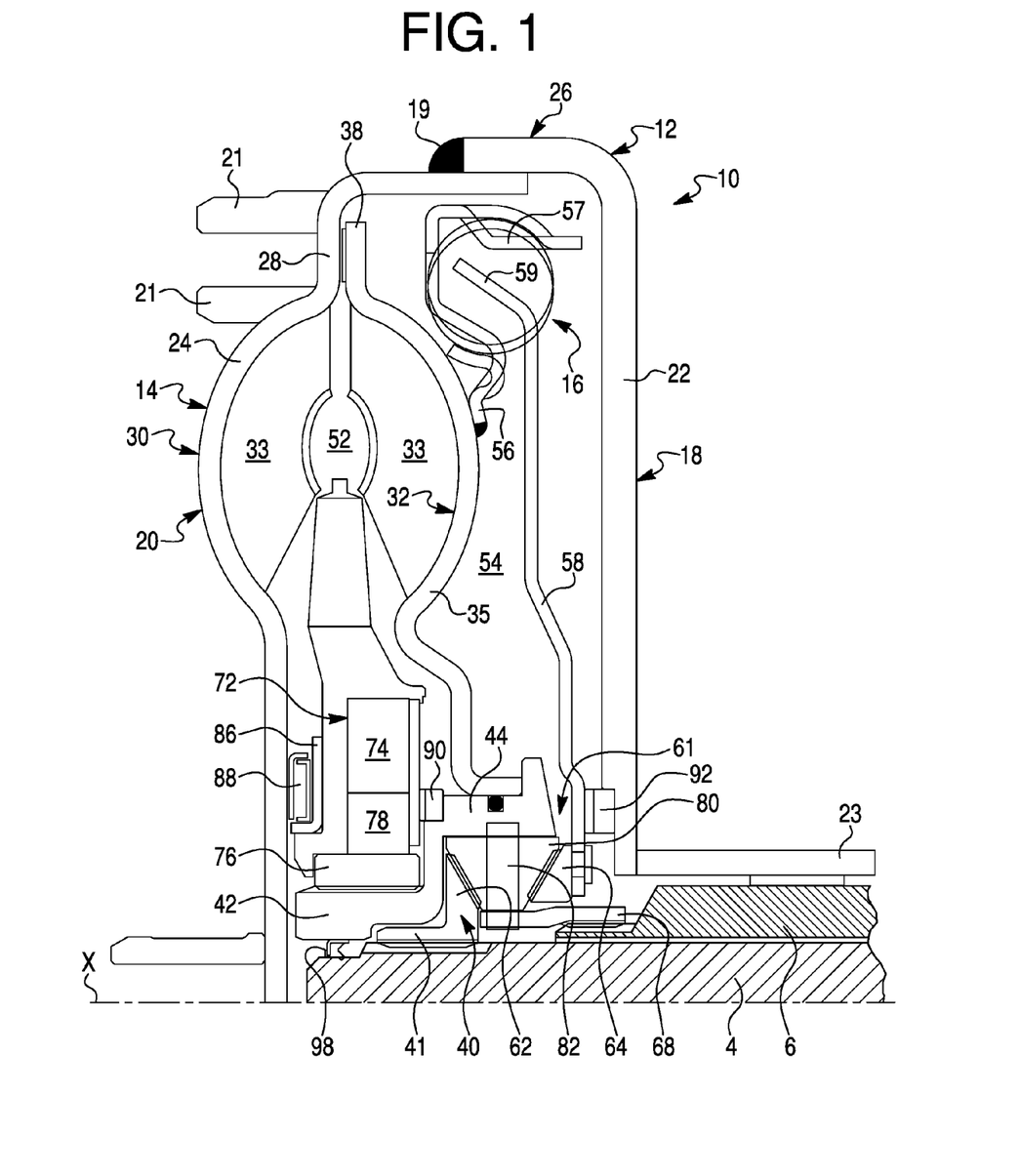
FIG. 1 is a fragmented half-view in axial cross section of a hydrokinetic torque coupling device in accordance with a first exemplary embodiment of the present invention.

A first exemplary embodiment of a hydrokinetic torque coupling device is generally represented in the accompanying drawings by reference numeral 10, as best shown in the fragmentary cross sectional view in FIG. 1. The hydrokinetic torque coupling device 10 is operable in known manner to fluidly couple a driving shaft and a driven shaft of a motor vehicle, such as an automobile. In the typical case, the driving shaft is an output shaft of an internal combustion engine (not shown) of the motor vehicle and the driven shaft is connected to an automatic transmission (not shown) of the motor vehicle.

The hydrokinetic torque coupling device 10 includes a sealed casing 12 filled with a fluid, such as oil or transmission fluid. The sealed casing 12, a torque converter 14, and a torsional vibration damper (also referred to herein as a damper assembly) 16 are all rotatable about a rotational axis X. The drawings discussed herein show half-views, that is, cross-sections of the portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a casing cover shell (or a first casing shell) 18, and an impeller shell (or a second casing shell) 20 disposed coaxially and axially opposite the casing cover 18. The first and second casing shells 18, 20 are non-movably (i.e., fixedly) interconnected sealingly together, such as by welding at weld 19 at their outer peripheries. The second casing shell 20 is non-movably (i.e., fixedly) interconnected to the driving shaft, more typically a flywheel (not shown) that is non-rotatably fixed to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel thereof with studs 21. As shown in FIG. 1, the studs 21 are secured, such as by welding, to the impeller shell 20. Each of the first and second casing shells 18, 20 may be made, for example, integrally by press-forming one-piece metal sheets.

The first casing shell 18 includes a first sidewall 22 extending substantially radially relative to the direction from the rotational axis X (i.e., in a plane that is generally transverse to the rotational axis X) and a cylindrical first outer wall portion $26_1$ (FIG. 2) extending substantially axially from the first sidewall 22 toward the second casing shell 20. Similarly, the second casing shell 20 includes a second sidewall 24 extending substantially radially relative to the direction from the rotational axis X and a cylindrical second outer wall portion $26_2$ extending substantially axially from the second sidewall 24 toward the first casing shell 18. The second sidewall 24 includes an integral piston engagement portion 28 having a first engagement surface $29_1$, best shown in FIG. 2. The piston engagement portion 28 is embodied as integral with the second sidewall 24 of the second casing shell 20, e.g., made of a single or unitary component. The first and second outer wall portions $26_1$, $26_2$ collectively establish an annular outer wall 26 substantially parallel with the rotation axis X. The weld 19 fixedly secures the outer wall portions $26_1$ and $26_2$ together.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly coupled to one another as known in the art.

Figure 2:
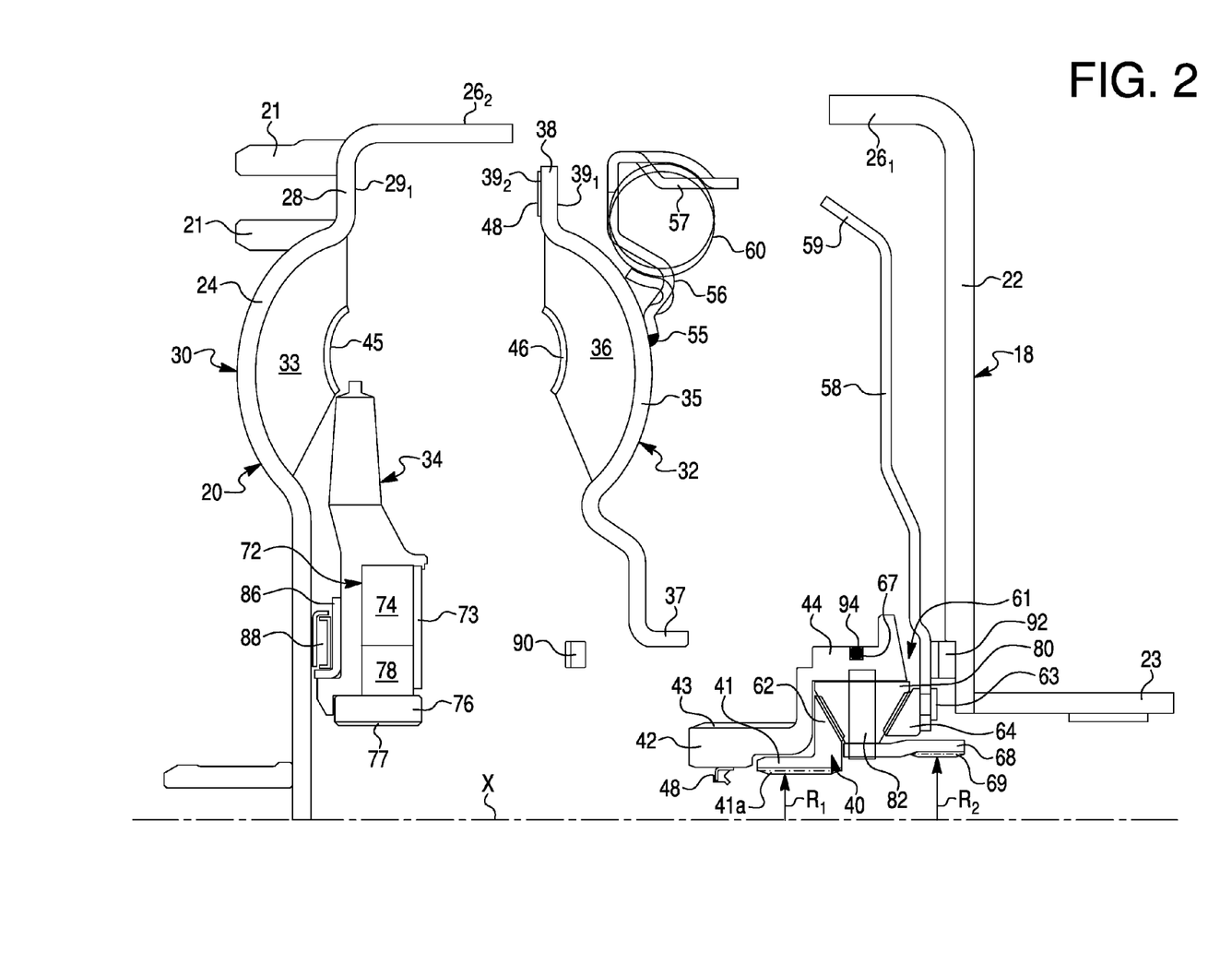
FIG. 2 is an exploded fragmentary cross-sectional view of the hydrokinetic torque coupling device of FIG. 1.

The second casing shell 20 of the casing 12 also forms and serves as the impeller shell of the impeller 30. Accordingly, the impeller shell 20 sometimes is referred to as part of the casing 12. Referring to FIG. 2, the impeller 30 further includes a core ring 45, and a plurality of impeller blades 33 fixedly attached, such as by brazing, to the impeller shell 20. The impeller 30, including the impeller shell 20, the core ring 45, and the blades 33, is non-rotatably secured to the first casing shell 18 and hence to the drive shaft (or flywheel) of the engine to rotate at the same speed as the engine output. The casing cover 18 also includes a casing hub 23 fixedly secured to the first sidewall 22 of the first casing shell 18. The casing hub 23 is arranged for engagement with a hydraulic pump of the transmission.

The piston engagement portion 28 is disposed radially outside of the impeller blades 33. The piston engagement portion 28 of the second sidewall 24 is in the form of a substantially annular, planar wall and extends substantially radially relative to the rotational axis X. The first engagement surface $29_1$ of the piston engagement portion 28 faces a turbine-piston flange 38 (discussed below) and the first casing shell 18, as shown in FIGS. 1 and 2.

The turbine-piston 32 is a consolidation or incorporation of a turbine with a lockup clutch piston. The turbine component of the turbine-piston 32 includes a turbine-piston shell 35, a core ring 46, and a plurality of turbine blades 36 fixedly attached, such as by brazing, to the turbine-piston shell 35. The spinning of the impeller 30 causes transmission fluid in the torus to spin the turbine blades 36, and hence the turbine-piston shell 35. The impeller shell 20 and the turbine-piston shell 35 collectively define a substantially toroidal first chamber (or torus chamber) 52 therebetween. Referring to FIG. 1, the torus chamber 52 is to the left side of the turbine-piston shell 35, and a second (or damper) chamber 54 is to the other (right) side of the turbine-piston shell 35. The first chamber 52 is defined between the impeller shell 20 and the turbine-piston shell 35, while the second chamber 54 is defined between the turbine-piston shell 35 and the first casing shell 18.

The stator 34 is positioned between the impeller 30 and the turbine-piston 32 to redirect fluid from the turbine-piston 32 back to the impeller 30 in an efficient manner. The stator 34 is typically mounted on a one-way clutch 72 to prevent the stator 34 from counter-rotation.

The one-way clutch 72 is disposed substantially in a bearing central bore in the stator 34 coaxially to the rotational axis X. The one-way clutch 72, as best shown in FIG. 2, includes an outer ring 74 non-rotationally secured (e.g., fixed) to the stator 34 coaxially to the rotational axis X, an inner ring 76 coaxial to the rotational axis X, and a plurality of sprags or rollers 78. The sprags or rollers 78 are circumferentially disposed in an annular space defined between the outer ring 74 and the inner ring 76, and act as cams. An inner peripheral surface of the inner ring 76 has splines 77 for coupling to radially outer splines 43 of an input shaft support 42. The outer ring 74 is mounted within the bearing central bore of the stator 34 coaxially to the rotational axis X so as to non-rotatably engage the stator 34. The outer ring 74 can be toothed externally and force-fit into the bearing central bore of the stator 34 so as to non-rotatably secure the outer ring 74 of the one-way clutch 72 to the stator 34.

The torque coupling device 10 further includes an output member 40 that is rotatable about the rotational axis X. The output member 40 is operatively coupled to and coaxial with the driven shaft. In the exemplary embodiment of FIG. 1, the output member 40 includes a substantially cylindrical output hub 41 and an output bevel gear 62 extending substantially radially outwardly from and formed integrally with the output hub 41. According to the exemplary embodiment of the present invention, the output member 40 with the output hub 41 and the output bevel gear 62 is formed as a single-piece part. Also, in the exemplary embodiment of FIG. 1, the output hub 41 is provided with internal splines 41a for non-rotatably coupling the output member 40 to the driven shaft, such as a transmission input shaft 4, provided with complementary external splines or grooves. Alternatively, a weld or other connection may be used to fix the output member 40 to the driven shaft.

The torsional vibration damper 16 is housed in the casing 12 axially between the turbine-piston 32 and the first sidewall 22 of the casing 12, as shown in FIG. 1. The torsional vibration damper 16 is connected to a drive (or input) member 56 (discussed below), and includes a plurality of circumferential elastic damping members 60, and a driven (or output) member 58 drivenly coupled to the drive member 56 through the circumferential damping members 60. According to the exemplary embodiment of FIG. 1, the damping members 60 are configured as helical (or coil) springs having a principal axis oriented substantially circumferentially. Other elastic members may be selected to replace or supplement the springs.

The drive member 56 is fixedly connected to the turbine-piston shell 35 of the turbine-piston 32, such as by weld 55, which may be a continuous annular weld. The output side of the drive member 56 has a plurality of driving tabs 57 (FIG. 2) extending axially in the direction away from the turbine-piston 32. The driving tabs 57 of the drive member 56 are circumferentially equidistantly spaced from one another, and engage circumferential ends of the first damping members 60.

The driven member 58 has a plurality of driven tabs 59 extending axially in an opposite direction to the driving tabs 57 of the drive member 56. The driven tabs 59 of the driven member 58 are circumferentially equidistantly spaced from one another, and engage the opposite circumferential ends of the damping members 60 than the driving tabs 57. The driven member 58 of the damper assembly 16 is rotatable relative to the drive member 56 and its driving tabs 57 due to elasticity of the damping members 60, which absorb torsional vibration.

Additionally, the driving tabs 57 of the drive member 56 are axially movable relative to the driven tabs 59 of the driven member 58. This relative axial movement between the driving tabs 57 and the driven tabs 59 may become necessary during axial movement of the turbine-piston 32 between its lockup and non-lockup positions. As discussed in greater detail below, when the turbine-piston 32 shifts axially due to a lockup event, the driving tabs 57 move axially relative to the driven tabs 59. Thus, the drive member 56 is both axially and circumferentially moveable relative to the driven member 58 of the damping assembly 16.

The torsional vibration damper 16, in particular, the driven member 58, and the damping members 60 are not axially movable relative to one another or relative to the output member 40. The axial movement between the drive member 56 and its driving tabs 57 relative to the driven tabs 59 allows the driven member 58, and the damping members 60 to remain fixed axially while the turbine-piston 32 and the drive member 56 move in the axial direction. In both the lockup and non-lockup modes, the drive member 56 is configured to rotationally drive the torsional vibration damper 16 and the output member 40.

As noted above, in the torque coupling device with the impeller and turbine reversed (i.e., when the impeller on the engine side, and the turbine is on the transmission side), a solid stationary shaft is substituted for the hollow stationary stator shaft normally used when the impeller and turbine are not reversed. Conversely, a hollow transmission shaft rotating about the solid stationary stator shaft is substituted for the solid transmission input shaft normally used when the impeller and turbine are not reversed. This substitution of parts in the reverse arrangement creates shaft support issues for the transmission.

In order to allow the stationary stator shaft and the transmission input shaft to retain their conventional orientation with the reversed impeller and turbine, the torque coupling device 10 embodied herein includes a bevel gearing 61 disposed within the casing 12 and arranged to transmit torque from the driven member 58 of the damper 16 to a transmission input shaft. The radial and axial positions of the stationary stator shaft and the transmission input shaft maintain the standard transmission interface in which the stationary stator shaft 6 is hollow and the transmission input shaft 4 is solid and extends within the hollow stationary stator shaft 6.

As best shown in FIGS. 1 and 2, the bevel gearing 61 of the torque coupling device 10 includes an input bevel gear 64 defining a first side gear of the bevel gearing 61, a stationary (i.e., non-rotatable) carrier 68, the output bevel gear 62 defining a second side gear of the bevel gearing 61, and one or more bevel pinions 80 rotatably supported by the carrier 68 and disposed between the output bevel gear 62 and the input bevel gear 64. The driven member 58 of the damper 16 is non-moveably secured (e.g., fixed or integrally formed) to the input bevel gear 64, such as by rivets 63 or welding. As a result, the bevel gearing 61 receives torque from the driven member 58 of the torsional vibration damper 16.

The bevel pinions 80 are coupled to rotate relative to the carrier 68 through corresponding number (for example, two or four) of carrier pins 82, which extend from the input shaft support 42 to the carrier 68 and non-rotatably interconnect the carrier 68 with the input shaft support 42. The carrier pins 82 extend radially and orthogonally to the rotational axis X. Radially outer ends of the carrier pins 82 are connected to a support hub 44 integral with the input shaft support 42. Radially inner ends of the carrier pins 82 are connected to the carrier 68, which has radially internal splines 69.

The radially internal splines 69 of the carrier 68 intermesh with complementary external splines or grooves to form a spline joint or key joint that non-rotatably connect the carrier 68 to a stationary (i.e., non-rotatable) hollow stator shaft 6 (shown in FIG. 1). The hollow stator shaft 6 axially extends about the transmission input shaft 4. Alternatively, a weld or other connection may be used to fix the carrier 68 to the stationary stator shaft 6. A sealing member 98, mounted to a radially inner peripheral surface of the input shaft support 42, creates a seal at the interface of the transmission input shaft 4 and the input shaft support 42, as best shown in FIG. 1.

As illustrated in FIG. 2, an internal radius $R_1$ of the internal splines 41a of the output member 40 is less than an internal radius R2 of the internal splines 69 of the carrier 68. Such an arrangement maintains the standard transmission interface, i.e., wherein the stationary stator shaft 6 is hollow and the transmission input shaft 4 is solid and extends within the hollow stationary stator shaft 6.

As further shown in FIGS. 1 and 2, the carrier 68, the carrier pins 82, the input shaft support 42, and the inner ring 76 of the one-way clutch 72 are all non-rotatable about the rotational axis X due to non-rotatable connection between the carrier 68 and the stationary stator shaft 6. As further illustrated in FIGS. 1 and 2, the bevel pinions 80 are in mesh with both the input bevel gear 64 and the output bevel gear 62 of the output member 40. Thus, while bevel pinions 80 is are rotational above about the rotational axis of the bevel pinions 80, bevel pinions 80 are not rotatable about the rotational axis X of the casing 12.

A radially outer, substantially cylindrical surface of the support hub 44 includes an annular groove 67 receiving a sealing member, such as an O-ring 94. Extending axially at a radially inner peripheral end of the turbine-piston shell 35 is a substantially cylindrical flange 37 that is proximate to the rotational axis. The substantially cylindrical flange 37 of the turbine-piston shell 35 is rotatable about axis X relative to the support hub 44. The sealing member (e.g., O-ring) 94 creates a seal at the interface of the substantially cylindrical flange 37 and the support hub 44 of the input shaft support 42. As discussed in further detail below, the turbine-piston 32 is axially movably relative to the output member 40 to allow sliding movement of the substantially cylindrical flange 37 along this interface during movement of the turbine-piston into and out of lockup mode.

Opposite first and second sides of the stator 34 include first and second bearing rings 86 and 73, respectively. A first thrust bearing 88 is mounted on the first bearing ring 86 and engages the impeller shell 20. A second thrust bearing 90 mounted on the second bearing ring 73 to engage the support hub 44. Another thrust bearing 92 is positioned between the casing cover shell 18 and the driven member 58 of the torsional vibration damper 16.

The piston component of the turbine-piston 32 includes a substantially annular, planar (i.e., flat) turbine-piston flange (or turbine-piston wall) 38. The turbine-piston flange 38 is distal to the rotational axis X relative to the above-discussed proximal flange 37. The turbine-piston flange 38 is a radial extension of the turbine-piston shell 35 and, as illustrated in FIG. 1, is disposed radially outside of the turbine blades 36. The turbine-piston flange 38 and the turbine-piston shell 35 are embodied as integral with one another, e.g., made of a single or unitary component, but may be separate components connected together. The turbine-piston flange 38 extends from a radially outer peripheral end $35_1$ of the turbine-piston shell 35 radially outward. The turbine-piston flange 38 extends sufficiently outward radially to at least partially axially overlap with the piston engagement portion 28 of the second casing shell 20.

As best shown in FIG. 2, the turbine-piston flange 38 has two axially opposite planar surfaces: a first surface $39_1$ facing the first sidewall 22 of the casing 12, and a second engagement surface $39_2$ facing and parallel to the first engagement surface $29_1$ of the piston engagement portion 28 of the second casing shell 20. The first and second engagement surfaces $29_1$ and $39_2$ extend outwardly, for example, generally radially, relative to the rotational axis X. The second engagement surface $39_2$ is movable axially toward and away from the first engagement surface $29_1$ of the casing 12 to position the turbine-piston flange 38 of the turbine-piston 32 respectively into and out of a lockup mode.

The second engagement surface $39_2$ of the turbine-piston flange 38 is provided with a friction ring (or friction lining) 48, best shown in FIG. 2. The friction ring 48 may be secured to the second engagement surface $39_2$, for example, by adhesive bonding and/or with fasteners. The friction ring 48 is made of a friction material for improved frictional performance. Alternatively, a friction ring (or friction lining) may be secured to the first engagement surface $29_1$. According to still another embodiment, a first friction ring or liner is secured to the first engagement surface $29_1$ of the casing 12 and a second friction ring or liner is secured to the second engagement surface $39_2$ of the turbine-piston flange 38. It is within the scope of the invention to omit one or both of the friction rings.

In the lockup mode, the first and second engagement surfaces $29_1$ and $39_2$ (or friction ring(s) 48 secured thereto) are pressed together such that the turbine-piston flange 38 of the turbine-piston 32 is frictionally non-rotatably coupled to the piston engagement portion 28 of the casing 12, thereby mechanically locking the turbine-piston 32 to the casing 12. When not in the lockup mode, the first and second engagement surfaces $29_1$ and $39_2$ are spaced from one another, such that the turbine-piston flange 38 is not frictionally non-rotatably coupled to the casing 12. In the non-lockup mode, normal operation of the torque converter 14 fluidly couples and decouples the impeller 30 to and from the turbine-piston 32.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35. A pressure increase in the damper chamber 54 relative to the torus chamber 52 (or stated differently, a pressure decrease in the torus chamber 52 relative to the damper chamber 54) shifts the turbine-piston 32 and the drive member 56 affixed thereto axially towards the engine, i.e., towards an input side of the casing 12, that is right to left in FIG. 1, into the lockup mode. On the other hand, a pressure decrease in the damper chamber 54 relative to the torus chamber 52 (or stated differently a pressure increase in the torus chamber 52 relative to the damper chamber 54) shifts the turbine-piston 32 and the drive member 56 affixed thereto axially away from the engine, i.e., towards an output side of the casing 12, that is left to right in FIG. 1, out of the lockup mode. Pressure changes are created by control of the fluid, e.g., hydraulic fluid or oil, in the chambers 52 and 54.

In operation, the lockup clutch 50 is generally activated after the hydraulic coupling of the driving and driven shafts, typically at relatively high speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be somewhat thicker than typical turbine shells that do not form or function as the lockup piston. Although not shown, a biasing member, such as a leaf spring, may be included in the hydrokinetic torque coupling device 10 to axially urge the turbine-piston 32 into or out of lockup mode.

In the lockup mode, the turbine-piston shell 35 is displaced axially towards the impeller 30 until the frictional ring 48 of the second engagement surface $39_2$ of the turbine-piston flange 38 (which moves axially with the turbine-piston shell 35) abuts against and is non-rotatably frictionally coupled to the first engagement surface $29_1$ of the casing 12. In the lockup mode, torque is transferred from the engine to the casing 12, then by way of the frictional engagement between surfaces $29_1$ and $39_2$ (or the frictional lining 48 thereof) to the drive member 56 welded to the turbine-piston shell 35, then serially to the damping assembly 16 and the output hub 40 through the bevel gearing 61. Thereby, the piston engagement portion 28 of the casing 12 and the turbine-piston flange 38 of the turbine-piston 32 together create a lockup clutch 50 that bypasses the hydrodynamic fluid coupling of the torque converter 14 and mechanically couples the driving and driven shafts. Moreover, the friction ring 48 secured to the second engagement surface $39_2$, may have a plurality of circumferentially spaced grooves (not shown) extending generally radially so as to fluidly connect the torus chamber 52 and the damper chamber 54 with one another in the lockup mode for cooling friction surfaces of the lockup clutch 50 by the working fluid.

In the non-lockup mode, the turbine-piston 32 is displaced axially away from the impeller 30, axially moving the turbine-piston shell 35 and the turbine-piston flange 38 until the second engagement surface $39_2$ (or the frictional lining 48 thereof) is spaced from and no longer non-rotatably frictionally coupled to the first engagement surface $29_1$. Thus, torque transferred from the engine to the casing 12 does not bypass the torque converter 14 through the lockup clutch 50.

In the lockup mode, torque received by the locked up turbine-piston flange 38 from the casing 12 is transmitted through the turbine-piston shell 35 and the drive member 56 welded thereto at 55 to the torsional vibration damper 16, then to the input bevel gear 64 connected to and non-rotatable relative to the driven member 58. The output torque from the input bevel gear 64, which rotates with the drive member 58 about the rotational axis X, is transmitted through the bevel pinions 80 to the output bevel gear 62 of the output member 40. The intermeshing of the pinions 80 with gears 62 and 64 causes the output bevel gear 62 to rotate in an opposite direction to that of the input bevel gear 64. Splines 41a drivingly connect the output member 40 to the driven shaft 4 to transmit the output torque to the driven shaft 4. An additional gearing may be employed downstream the hydrokinetic torque coupling device 10 to revert the rotational direction of the output member 40 to rotate in the same direction as the direction of rotation of the casing 12.

As the turbine-piston 32 and the drive member 56 move axially into lockup mode as described above, the driving tabs 57 of the drive member 56 are axially displaced relative to the driven tabs 59 of the driven member 58. The relative axial movement between the driving tabs 57 and the driven tabs 59 allows the driven member 58 and the damping members 60 to remain fixed axially to the damper hub 64 while the turbine-piston 32 and the drive member 56 move in the axial direction.

The turbine-piston 32 forms both the shell component of the turbine and the piston component of the lockup clutch, as described above. By consolidating two components that are normally separate from one another into a single component, space is saved in the torque hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components.

Figure 3:
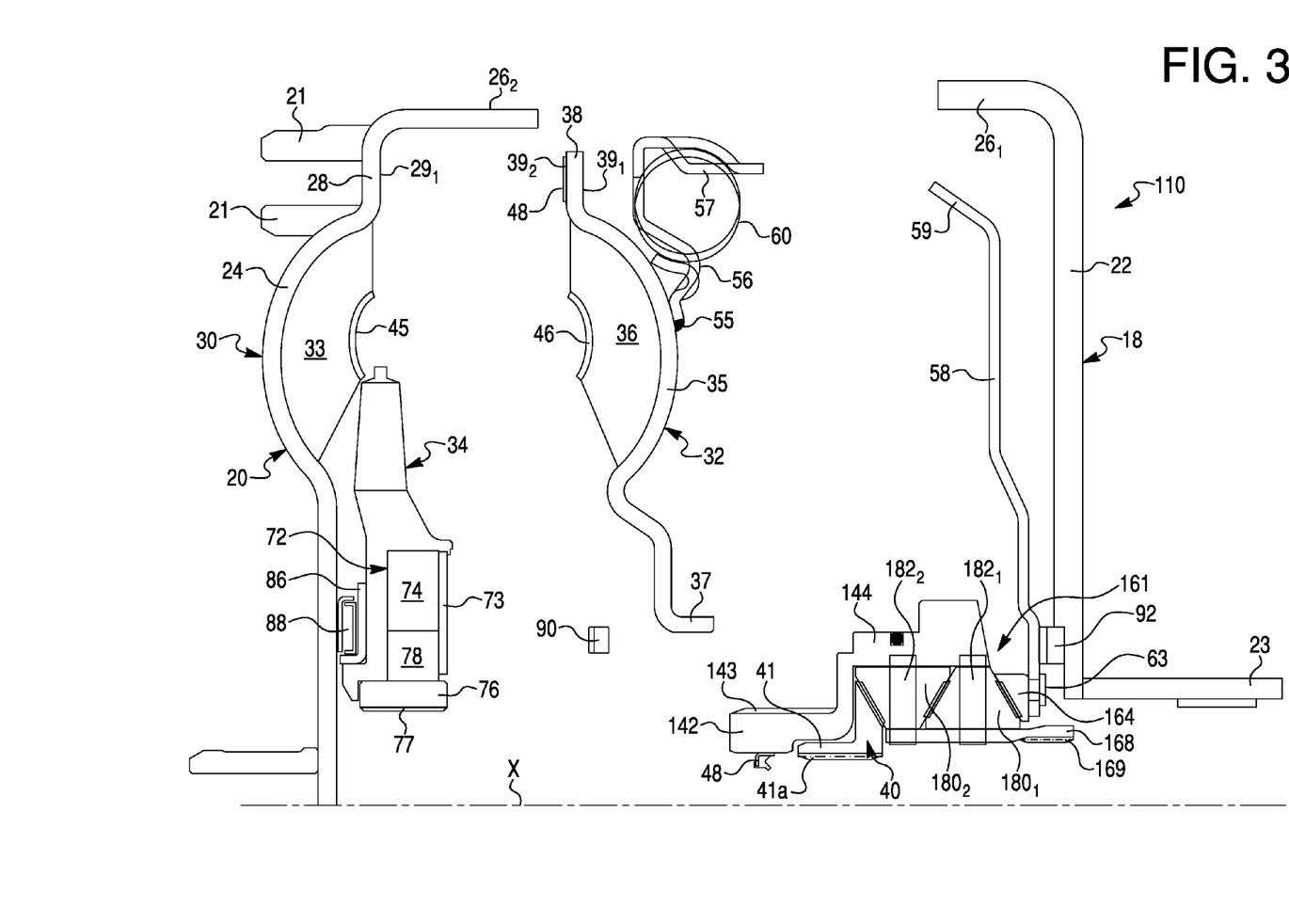
FIG. 3 is an exploded fragmentary cross-sectional view of a hydrokinetic torque coupling device in accordance with an alternative exemplary embodiment of the present invention.

Various modifications, changes, and alterations may be practiced with the above-described embodiment, including but not limited to the additional embodiments shown in FIGS. 1 and 2. For example, according to an alternative exemplary bevel gearing 161 having two sets of bevel pinions is provided, as illustrated in FIG. 3. The torque coupling device according to the alternative exemplary embodiment of FIG. 3 corresponds substantially to the torque coupling device 10 of FIGS. 1 and 2, and only the bevel gearing 161, which differs, will therefore be explained in detail below. In the interest of brevity, reference characters in FIG. 3 that are discussed above in connection with FIGS. 1 and 2 are not further elaborated upon below, except to the extent necessary or useful to explain the additional embodiment of FIG. 3. Modified components and parts are indicated by the addition of 100 to the reference numerals of the components or parts.

The bevel gearing 161 comprises a rotatable input bevel gear 164 defining a first side gear of the bevel gearing 161, a stationary carrier 168 that is non-rotatable about the rotational axis X, an output bevel gear 62 defining a second side gear of the bevel gearing 161, one or more first bevel pinions $180_1$, and one or more second bevel pinions $180_2$ rotatably supported by the carrier 168 and disposed between the output bevel gear 62 and the input bevel gear 164. The driven member 58 of the damper 16 is non-moveably secured (e.g., fixed) to the input bevel gear 164, such as by rivets 63 or welding. In other words, the bevel gearing 161 receives torque from the driven member 58 of the torsional vibration damper 16.

As with the first exemplary embodiment, the carrier 168 is connectable to a stationary stator shaft 4, which prevents rotation of the carrier 68 about rotational axis X. The first bevel pinions $180_1$ are coupled to rotate relative to the carrier 68 about first carrier pins $182_1$, while the second bevel pinions $180_2$ are coupled to rotate relative to the carrier 168 about second carrier pins $182_2$. The bevel pinions $180_1$, $180_2$ and the carrier pins $182_1$, $182_2$ are not rotatable about rotational axis X due to their connection to the carrier 168. Both the first and second carrier pins $182_1$ and $182_2$, respectively, extend axially from a support flange 144 of an input shaft support 142 to the carrier 168 to non-rotatably interconnect the carrier 168 with the input shaft support 142.

As illustrated in FIG. 3, outer gear teeth of the first bevel pinions $180_1$ mesh with gear teeth of the input bevel gear 164 and the second bevel pinions $180_2$, while the gear teeth of the second bevel pinions $180_2$ mesh with the outer gear teeth of the first bevel pinions $180_1$ and output bevel gear 62 of the output member 40. The rotating input bevel gear 164 transmit torque through the first bevel pinions $180_1$ to the second bevel pinions $180_2$ to the output bevel gear 62 of the output member 40, which is drivingly connected to the driven shaft 4, such as by splines 41a. As a result, the first bevel pinions $180_1$ change the rotational direction of the output member 40 and, subsequently, of the transmission input, relative to the rotation of the casing 12, while the second bevel pinions $180_2$ revert the rotational direction to the normal direction of the output member 40 and, subsequently, of the transmission input, to the normal direction.

Thus, two bevel pinions $180_1$ and $180_2$ placed in series provide a double inversion so that the output member 40 rotates in the same direction as the input bevel gear 164 and the casing 12.

Figure 4:
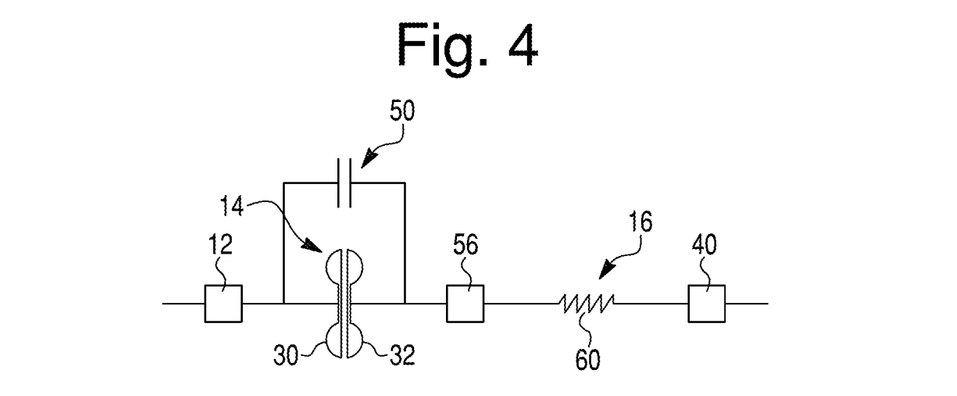
FIG. 4 is a simplified diagram of a hydrokinetic torque coupling device including a turbine-piston with a single damper assembly.

The torque converters and hydrodynamic torque coupling devices described herein may incorporate different damper assemblies. For example, FIG. 4 shows a hydrodynamic torque coupling devices including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 of the damper assembly 16 and the output member 40 are arranged serially downstream of the turbine-piston shell 35 in FIG. 4. The diagram of FIG. 4 generally corresponds to the arrangement of the embodiments shown in FIGS. 1-3.

Figure 5:
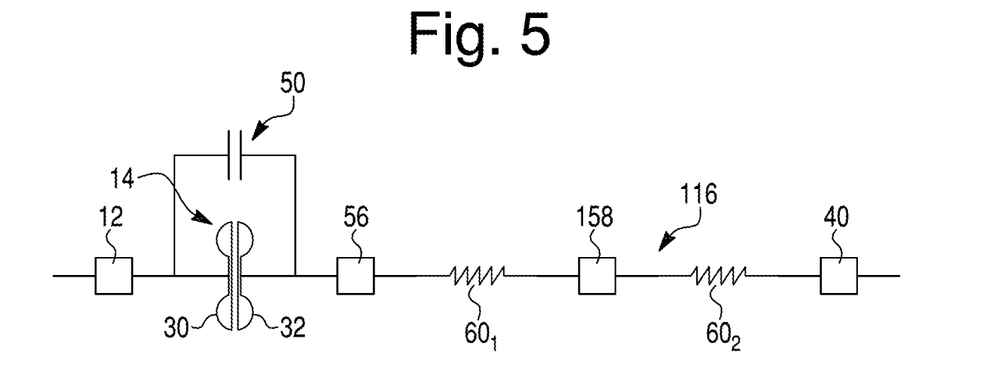
FIG. 5 is a simplified diagram of another hydrokinetic torque coupling device including a turbine-piston with dual or double damper assemblies.

FIG. 5 shows an alternative damper assembly 116 similar to that of FIG. 4, but in which the damper assembly 16 is modified to include the elastic damping members 60 as a first set of circumferentially extending elastic damping members $60_1$ and to further include a second set of circumferentially extending elastic damping members $60_2$ positioned radially inward of the first set of elastic damping members $60_1$. In place of the output or driven member 58 of FIGS. 1-3, an intermediate member 158 is interposed serially between the first and second sets of elastic damping members $60_1$ and $60_2$. In turn, the second set of elastic damping members $60_2$ is interposed serially between the intermediate member 158 and the output member 40.

Figure 6:
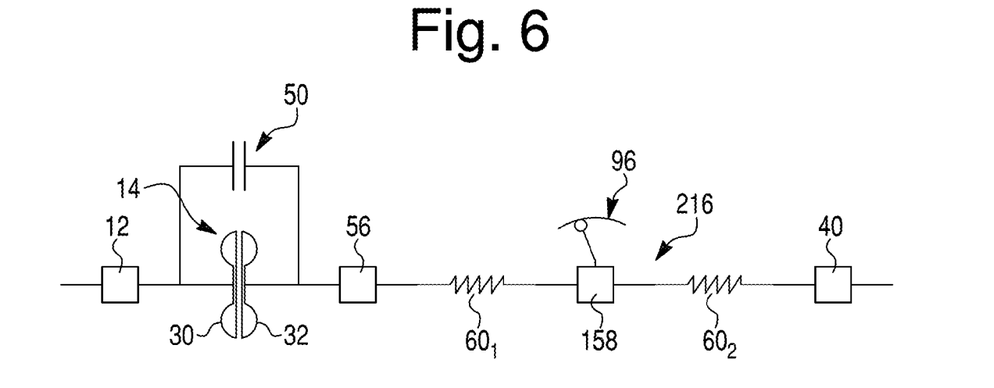
FIG. 6 is a simplified diagram of still another hydrokinetic torque coupling device including a turbine-piston with dual or double damper assemblies and a pendulum vibration absorber.

A damper assembly 216 shown in FIG. 6 is similar to that of FIG. 5, but further includes pendulum vibration absorbers 96 coupled to an intermediate member 158. Pendulum vibration absorbers 96 are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The pendulum vibration absorbers 96 may be coupled to the circumference of the intermediate member 158 and may be arranged on both sides of the intermediate member 158.

Figure 7:
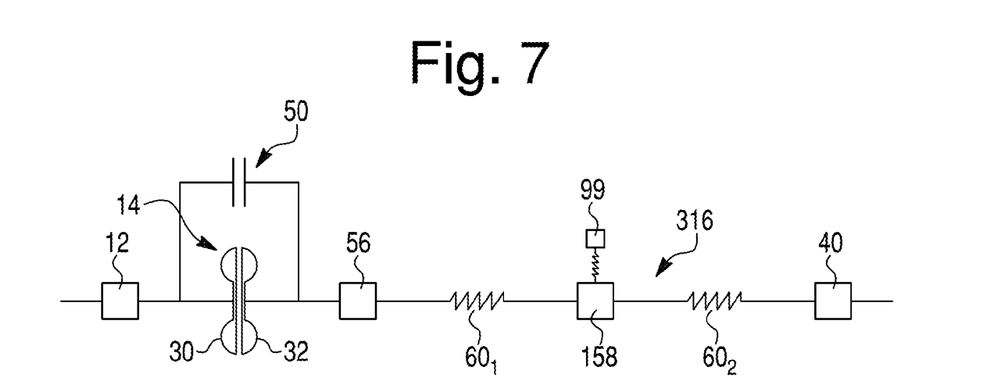
FIG. 7 is a simplified diagram of a further hydrokinetic torque coupling device including a turbine-piston with dual or double damper assemblies and a vibration absorbing spring-mass system.

A damper assembly 316 shown in FIG. 7 is similar to that of FIG. 5, but further includes a spring mass system 99 coupled to an intermediate member 158. Spring-mass systems are well known in the art and described in, for example, WO 2004/018897 to Haller. The spring-mass system 99 may be coupled to the circumference of the intermediate member 158. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable with one another in numerous combinations.

The foregoing description of the exemplary embodiment (s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the torque coupling device comprising:
   a casing rotatable about a rotational axis and having an interior volume, the casing comprising a casing cover shell and an impeller shell disposed axially opposite to and fixedly connected to the casing cover shell;
   an impeller coaxially aligned with the rotational axis and comprising the impeller shell;
   a turbine-piston coaxially aligned with and hydrodynamically drivable by the impeller and comprising a turbine-piston shell;
   a stator situated between the impeller and the turbine-piston;
   an output member including an output bevel gear;
   an input bevel gear drivenly connected to the turbine-piston;
   a carrier configured to connect to a stator shaft to prevent rotation of the carrier about the rotational axis of the casing; and
   a bevel pinion rotatably supported by the carrier, the bevel pinion meshing with the input bevel gear and the output bevel gear of the output member.

2. The hydrokinetic torque coupling device as defined in claim 1, further comprising a carrier pin on which the bevel pinion is rotatably mounted, wherein the carrier pin is connected to the carrier and radially extends from the carrier to support the bevel pinion rotatably about the carrier pin.

3. The hydrokinetic torque coupling device as defined in claim 2, further comprising a one-way clutch for supporting stator, wherein the one-way clutch includes an inner ring coaxial to the rotational axis.

4. The hydrokinetic torque coupling device as defined in claim 3, further comprising an input shaft support non-rotatably connected to the carrier through the carrier pin radially extending between the carrier and the input shaft support.

5. The hydrokinetic torque coupling device as defined in claim 4, wherein the input shaft support is non-rotatably coupled to the inner ring of the one-way clutch.

6. The hydrokinetic torque coupling device as defined in claim 1, wherein the bevel pinion comprises first and second bevel pinions coupled to the carrier and rotatable about longitudinal axes of the bevel pinions, wherein the first bevel pinion meshes with the input bevel gear and the second bevel pinion, and wherein the second bevel pinion meshes with the first bevel pinion and the output bevel gear of the output member.

7. The hydrokinetic torque coupling device as defined in claim 6, wherein the first bevel pinion is rotatably mounted on a first carrier pin, wherein the second bevel pinion is rotatably mounted on a second carrier pin, and wherein the first and second carrier pins are connected to the carrier and radially extend from the carrier so as to support the first and second bevel pinions rotatably about the first and second carrier pins.

8. The hydrokinetic torque coupling device as defined in claim 1, wherein the output member comprises an output hub with an internal radius that is less than an internal radius of the carrier.

9. The hydrokinetic torque coupling device of claim 1, further comprising a torsional vibration damper drivingly connecting the turbine-piston shell to the input bevel gear.

10. The hydrokinetic torque coupling device of claim 9, further comprising a drive member non-movably connected to the turbine-piston shell, wherein the torsional vibration damper comprises a driven member connected to and non-rotatable relative to the input bevel gear, and a plurality of circumferential elastic damping members drivingly coupling the drive member to the driven member.

11. The hydrokinetic torque coupling device of claim 10, wherein the drive member is axially movable relative to the driven member and the elastic damping members of the torsional vibration damper.

12. The hydrokinetic torque coupling device of claim 9, wherein the turbine-piston shell partitions an interior volume of the casing into a torus chamber and a damper chamber, wherein the torus chamber contains impeller blades of the impeller and turbine blades of the turbine-piston, and wherein the damper chamber contains the torsional vibration damper.

13. The hydrokinetic torque coupling device of claim 9, further comprising a drive member non-movably connected to the turbine-piston shell, wherein the torsional vibration damper comprises an intermediate member, a first set of circumferentially extending elastic damping members drivingly coupling the drive member to the intermediate member, a driven member connected to and non-rotatable relative to a damper hub, a second set of circumferentially extending elastic damping members drivingly coupling the intermediate member to the driven member, and a centrifugal pendulum oscillator mounted to the intermediate member.

14. The hydrokinetic torque coupling device of claim 9, further comprising a drive member non-movably connected to the turbine-piston shell, wherein the torsional vibration damper comprises an intermediate member, a first set of circumferentially extending elastic damping members drivingly coupling the drive member to the intermediate member, a driven member connected to and non-rotatable relative to a damper hub, a second set of circumferentially extending elastic damping members drivingly coupling the intermediate member to the driven member, and a spring mass system coupled to the intermediate member.

15. The hydrokinetic torque coupling device of claim 1, wherein the impeller shell comprises a piston engagement portion having a first engagement surface, wherein the turbine-piston shell comprises a turbine-piston flange and partitions the interior volume of the casing into a first chamber between the impeller shell and the turbine-piston shell and a second chamber between the turbine-piston shell and the casing shell, and wherein the turbine-piston flange has a second engagement surface facing the first engagement surface and movable axially toward and away from the first engagement surface to position the hydrokinetic torque coupling device respectively into and out of a lockup mode in which the first and second engagement surfaces are frictionally, non-rotatably coupled to one another to mechanically lock the turbine-piston to the piston engagement portion.

16. The hydrokinetic torque coupling device of claim 15, wherein the turbine-piston shell and the turbine-piston flange are axially movable towards an input side of the hydrokinetic torque coupling device in order to frictionally couple the first and second engagement surfaces and position the turbine-piston in the lockup mode, and wherein the turbine-piston shell and the turbine-piston flange are axially movable towards an output side of the hydrokinetic torque coupling device so that the first and second engagement surfaces are not frictionally coupled when the turbine-piston is out of the lockup mode.

17. The hydrokinetic torque coupling device of claim 15, wherein the piston engagement portion extends radially outwardly.

18. The hydrokinetic torque coupling device of claim 15, further comprising a frictional lining secured to the first engagement surface or the second engagement surface.

19. A method of assembling a hydrokinetic torque coupling device for coupling a driving shaft and a driven shaft together, the method comprising the steps of:
   providing a torque converter coaxially aligned with and rotatable about a rotational axis, the torque converter comprising an impeller, a turbine-piston, and a stator disposed between the impeller and the turbine-piston, the impeller comprising an impeller shell and a plurality of impeller blades, the turbine-piston comprising a turbine-piston shell, a plurality of turbine blades, and an axially movable turbine-piston flange;
   providing an output member including an output bevel gear, a rotatable input bevel gear, a carrier configured to connect to a stator shaft to prevent rotation of the carrier about the rotational axis of the torque converter, and a bevel pinion supported by the carrier and rotatable about a longitudinal axis of the bevel pinion; and
   combining the torque converter with a casing shell, the output member, the input bevel gear and the carrier with the bevel pinion to provide a structure in which (i) the casing shell and the impeller shell collectively establish a casing of the hydrokinetic torque coupling device, (ii) the turbine-piston shell is positioned in the casing to partition an interior volume of the casing into a first chamber between the impeller shell and the turbine-piston shell, and a second chamber between the turbine-piston shell and the casing shell, (iii) the input bevel gear is drivenly connected to the turbine-piston, and (iv) the bevel pinion is positioned to transmit torque from the input bevel gear to the output member when the hydrokinetic torque device is in a lockup mode.

20. A method of operating a hydrokinetic torque coupling device comprising a casing that is rotatable about a rotational axis and comprises a casing shell and an impeller shell disposed axially opposite to and fixedly connected to the casing shell, an impeller comprising the impeller shell and a piston engagement portion having a first engagement surface, a turbine-piston comprising a turbine-piston shell including a turbine-piston flange with a second engagement surface, a stator situated between the impeller and the turbine-piston, an output member including an output bevel gear, a rotatable input bevel gear, a carrier configured to connect to a stator shaft to prevent rotation of the carrier about the rotational axis of the casing, and a bevel pinion supported by the carrier and rotatable about a longitudinal axis of the bevel pinion, the bevel pinion meshing with gear teeth of the input bevel gear and gear teeth of the output bevel gear of the output member; the method comprising:
   axially displacing the turbine-piston relative to the casing to move the second engagement surface toward and away from the first engagement surface of the piston engagement portion to position the hydrokinetic torque coupling device respectively into and out of a lockup mode in which the first and second engagement surfaces are frictionally, non-rotatably coupled to one another to mechanically lock the turbine-piston to the piston engagement portion.

* * * * *